V. HARHORN.
REVERSING SWITCH FOR ELECTRIC MOTORS WITH OPPOSITELY ROTATING MAGNETS AND ARMATURES.
APPLICATION FILED MAR. 11, 1911.
1,011,778. Patented Dec. 12, 1911.
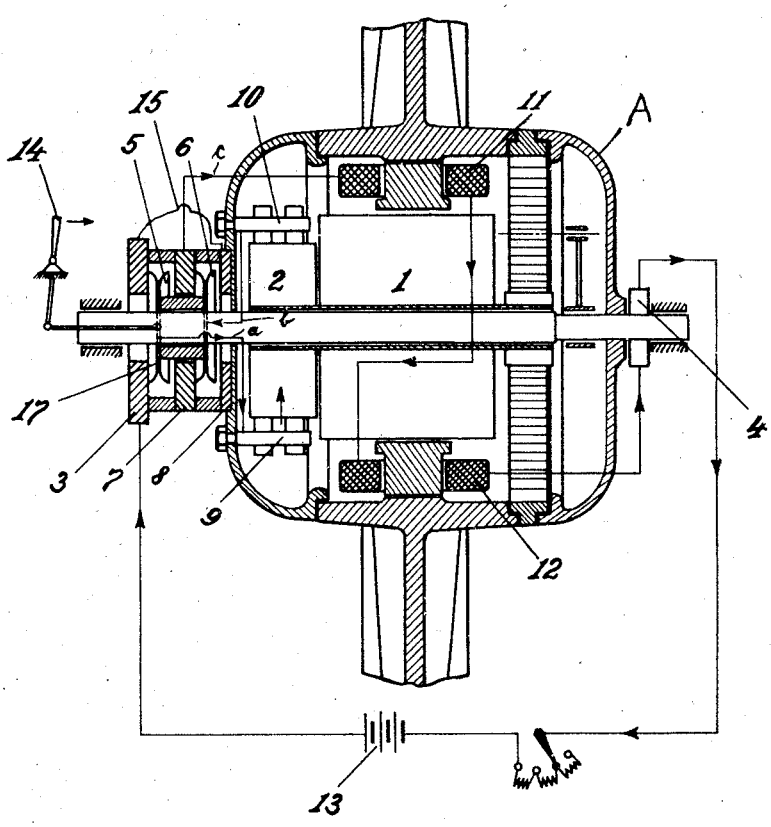

UNITED STATES PATENT OFFICE.

VICTOR HARHORN, OF FRIEDENAU, GERMANY.

REVERSING-SWITCH FOR ELECTRIC MOTORS WITH OPPOSITELY-ROTATING MAGNETS AND ARMATURES.

1,011,778.  Specification of Letters Patent.  Patented Dec. 12, 1911.

Application filed March 11, 1911. Serial No. 613,855.

*To all whom it may concern:*

Be it known that I, VICTOR HARHORN, a subject of the Emperor of Germany, residing at Friedenau, in Germany, have invented a certain new and useful Improvement in Reversing-Switches for Electric Motors with Oppositely-Rotating Magnets and Armatures, of which the following is a specification.

This invention relates to electric motors with oppositely rotating magnets and armatures, and more particularly to electric motors for automobile vehicles, of the class wherein a motor is built up inside a road-wheel, the field-magnet forming the hub, or part of the hub, and armature being rotated in the opposite direction to the hub, by means of suitable gearing. With motors of this class, having brushes rotating with the magnet, it is necessary to use slip-rings for the inflow and outflow of current, and the object of this invention is to provide convenient means for reversing the current in the armature without using more than two slip-rings.

The invention is illustrated in the accompanying drawing, which is a transverse section of the hub, with some of the internal parts shown in elevation, and with the electric circuit diagrammatically indicated.

In the drawing, 1 is the armature, and 2 the commutator, A being the box-like hub, with inwardly directed field-magnets 11 and 12.

3 and 4 are the two slip-rings rotating with the hub. Adjacent to the slip-ring 3 there are two insulated metal contact disks 7 and 8, both fixed to the hub and thereby to the rotatable magnet. Between the slip-ring 3 and the contacts 7 and 8 there are two double contact springs 5 and 6 mounted on a slidable and rotatable sleeve 17, which can be axially moved by means of a lever 14, the connection of the latter to the sleeve being such as to allow the sleeve to rotate without rotation of the lever. In the position in which the sleeve is shown in the drawing, the springs 5 and 6 make contact with the slip-ring 3 and contact disk 7 respectively. By shifting the sleeve 17 to the right the spring 5 can be brought into contact with the disk 7, and the spring 6 into contact with the disk 8. The springs 5 and 6 are conductively connected by wires $a$ and $b$ to brushes 9 and 10 respectively, the disk 7 is connected by wire $c$ to the magnet-coils, and the slip-ring 3 is connected by wire 15 to the disk 8.

With the springs 5 and 6 placed as shown in the drawing, the current flows from the accumulator battery 13 to the slip-ring 3, thence through the spring 5 and wire $a$ to the brush 9, and from the other brush 10 and wire $b$ to the spring 6 and disk 7; from the latter through wire $c$ to the field-magnets 11 and 12, and finally to the other slip-ring 4 and thence back to the battery 13. If the lever 14 is moved to make connection between spring 5 and disk 7, and spring 6 and disk 8, the current supplied from the battery 13 to the slip ring 3 passes through wire 15 to the disk 8 and thence through spring 6 and wire $b$ to brush 10, then through the commutator 2 and armature 1 to the brush 9, and through wire $a$, spring 5, disk 7, wire $c$, magnets 11 and 12, and slip-ring 4 back to the battery. It will be seen that the current in the armature is reversed by shifting the sleeve 17.

What I claim as my invention and desire to secure by Letters Patent of the United States:—

1. The combination of a rotatable field magnet, a rotatable motor armature, two armature brushes, two slip-rings, a contact fixed to the magnet and electrically connected to one of the slip rings, a second contact fixed to the magnet and electrically connected to the other slip-ring, and two collectively movable contacts severally connected to said brushes, enabling one brush to be alternatively connected to the first or the second fixed contact and the other brush to be alternatively connected to the second fixed contact or to the slip-ring which is connected to the first fixed contact.

2. The combination of a rotatable field magnet, a rotatable motor armature, a commutator, two brushes contacting with said commutator, a slip-ring, a contact electrically connected to the coils of said field magnet, a contact electrically connected to said slip-ring, and two collectively movable contacts severally connected to said brushes, enabling one brush to be alternatively connected to the slip-ring or to the contact connected to the magnet coils, and the other brush to be alternatively connected to the last-mentioned contact or to the contact joined to the slip-ring.

3. The combination with a road-wheel hub of a field magnet with inwardly directed poles fixed to said hub, an armature rotatable within said hub, a commutator, two brushes contacting with said commutator, a slip-ring, a contact electrically connected to the coils of said field magnet, a contact electrically connected to said slip-ring, and two collectively movable contacts severally connected to said brushes, enabling one brush to be alternatively connected to the slip-ring or to the contact connected to the magnet coils, and the other brush to be alternatively connected to the last-mentioned contact or to the contact joined to the slip-ring.

In witness whereof I have signed this specification in the presence of two witnesses.

VICTOR HARHORN.

Witnesses:
 HENRY HASPER,
 WOLDEMAR HAUPT.